US006693651B2

(12) United States Patent
Biebesheimer et al.

(10) Patent No.: US 6,693,651 B2
(45) Date of Patent: Feb. 17, 2004

(54) CUSTOMER SELF SERVICE ICONIC INTERFACE FOR RESOURCE SEARCH RESULTS DISPLAY AND SELECTION

(75) Inventors: Debra L. Biebesheimer, Carmel, NY (US); Donn P. Jasura, Staatsburg, NY (US); Neal M. Keller, Somers, NY (US); Daniel A. Oblinger, New York, NY (US); Mark E. Podlaseck, New Preston, CT (US); Stephen J. Rolando, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 09/778,147

(22) Filed: Feb. 7, 2001

(65) Prior Publication Data

US 2002/0105550 A1 Aug. 8, 2002

(51) Int. Cl.[7] .................................................. G09G 5/00
(52) U.S. Cl. ....................................... 345/837; 345/805
(58) Field of Search ................................. 345/854, 853, 345/855, 771–773, 706, 704, 703, 707–714, 752, 753, 754, 766.765, 767, 802, 804, 805, 821–824, 837, 835–839, 840–847, 848–850; 707/102, 103, 10, 11, 500, 510, 557, 810, 531; 703/5, 14, 28; 709/223, 224

(56) References Cited

U.S. PATENT DOCUMENTS 5,446,891 A    8/1995    Kaplan et al.
5,826,260 A   10/1998    Byrd, Jr. et al.

OTHER PUBLICATIONS

Billsus, D., et al., "A learning agent for wireless news access," Proceedings of IUI 2000: International Conference on Intelligent User Interfaces, ACM, Jan. 9–12, 2000, pp. 33–36, XP–002205011.

(List continued on next page.)

Primary Examiner—Steven Sax
(74) Attorney, Agent, or Firm—Scully, Scott, Murphy & Presser; Daniel P. Morris, Esq.

(57) ABSTRACT

A graphical user interface for a customer self service system that performs resource search and selection including a system and method for controlling a display of resources resulting from a query initiated by a user of the system. The system and method for controlling the display includes the steps of: enabling via a first graphic interface, entry of a query and selection of one or more user context icons, each representing a context associated with the current user situation and having context attribute parameters associated therewith; enabling, via a second graphic interface, user specification of relevant resource selection criteria for enabling expression of relevance of resource results in terms of user context; searching a resource database and generating a resource response set for best matching a user's query, user context attributes and user defined relevant resource selection criteria; and, displaying via a third graphic interface, the response set of resources that the customer self service system has determined to match the user's query based on the user's context, attributes and user defined resource selection criteria utilized in search. Central to the system is the expression of the relevance of results in terms of user context in a manner optimized to facilitate resource selection.

37 Claims, 8 Drawing Sheets

OTHER PUBLICATIONS

Olsen, K., et al., "Visualization of a Document Collection: the Vibe System", Information Processing & Management, Elsevier, Barking, GB, vol. 29, No. 1, 1993, pp. 69–81, XP 000574984.

Mladenic, D, "Text–learning and related intelligent agents: a survey", IEEE Intelligent Systems, IEEE, vol. 14, No. 4, Jul. 1999, pp. 44–54, XP–002205012.

Göker, A., "Capturing Information Need by Learning User Context", 16th International Joint Conferent in Artificial Intelligence: Learning About User Workshop, Jul. 31, 1999, pp. 21–27, XP–00205013.

Anonymous, "Taxonomized Web Search", IBM Technical Disclosure Bulletin, IBM Corp. New York, US, vol. 40, No. 5, May 1, 1997, pp. 195–196, XP–002133594; and.

Davies, J., et al., "Knowledge Discovery and Delivery", British Telecommunications Engineering, London, GB, vol. 17, No. 1, Apr. 1, 1998, pp. 25–35, XP–000765546.

FIG. 3

| | EDUCATION (EX: ENVIRONMENT) ⟋60 | EDUCATION (EX: SUBJECT MATTER) ⟋70 | REAL ESTATE ⟋80 | TRAVEL ⟋90 |
|---|---|---|---|---|
| USER QUERY | LEARN LOTUS NOTES AT HOME <br> 61 | BECOME A LINUX DEVELOPER BY JUNE <br> 71 | FIND HOUSING NEAR NEW JOB BY AUGUST <br> 81 | PLAN A TRIP TO VERMONT IN JUNE <br> 91 |
| USER CONTEXT | CORP EXEC AT HQ REMOTE STAFFIE COMMUTING TECHIE TRAVELING CONSULTANT <br> 62 | CORP EXEC AT HQ REMOTE STAFFIE COMMUTING TECHIE TRAVELING CONSULTANT <br> 72 | RELOCATING BUSINESS PROFESSIONAL EMPTY NESTER COLLEGE STUDENT <br> 82 | SINGLE MOM W/KIDS SWINGING SINGLES BUSINESS TRAVELER <br> 92 |
| CONTEXT ATTRIBUTE | CONNECTIVITY LEARNING MODE(S) TECHNICAL FIELD <br> 63 | CONNECTIVITY LEARNING MODE(S) TECHNICAL FIELD <br> 73 | MODE OF COMMUTE TO WORK/SCHOOL MODE OF HOUSING MAINTENANCE STYLE <br> 83 | MODE OF TRANSPORTATION MODE OF HOUSING FOOD STYLE <br> 93 |
| ATTRIBUTE VALUE | LAN CONNECTED DIAL UP DSL DISCONNECTED <br> 64 | SECURITY GRAPHICAL INTERFACES PROGRAMMING SYSTEMS INTEGRATION <br> 74 | CAREFREE LIVING SUBCONTRACT IT ALL DO-IT-YOURSELF-ER <br> 84 | DRIVE FLY TRAIN <br> 94 |
| VALUE RESOURCE PARAMETERS | INCLUDE: DOWNLOAD & PLAY RESOURCES <br> --------- <br> EXCLUDE: ON LINE COLLABORATIVE RESOURCES <br> 65 | INCLUDE KDE <br> --------- <br> EXCLUDE GNOME <br> 75 | INCLUDE WALLS INCLUDE PAINT INCLUDE LAWN MOWING <br> --------- <br> EXCLUDE PLUMBING EXCLUDE ELECTRICAL EXCLUDE LANDSCAPING <br> 85 | INCLUDE ALL MAJOR CARRIERS <br> --------- <br> EXCLUDE PROP PLANES EXCLUDE BAD SAFETY RECORDS <br> 95 |
| RESOURCE SELECTION CRITERIA & VALUES | COST TIME QUALITY RISK <br> 66 | COST TIME QUALITY RISK <br> 76 | COST TIME QUALITY RISK <br> 86 | COST TIME QUALITY RISK <br> 96 |

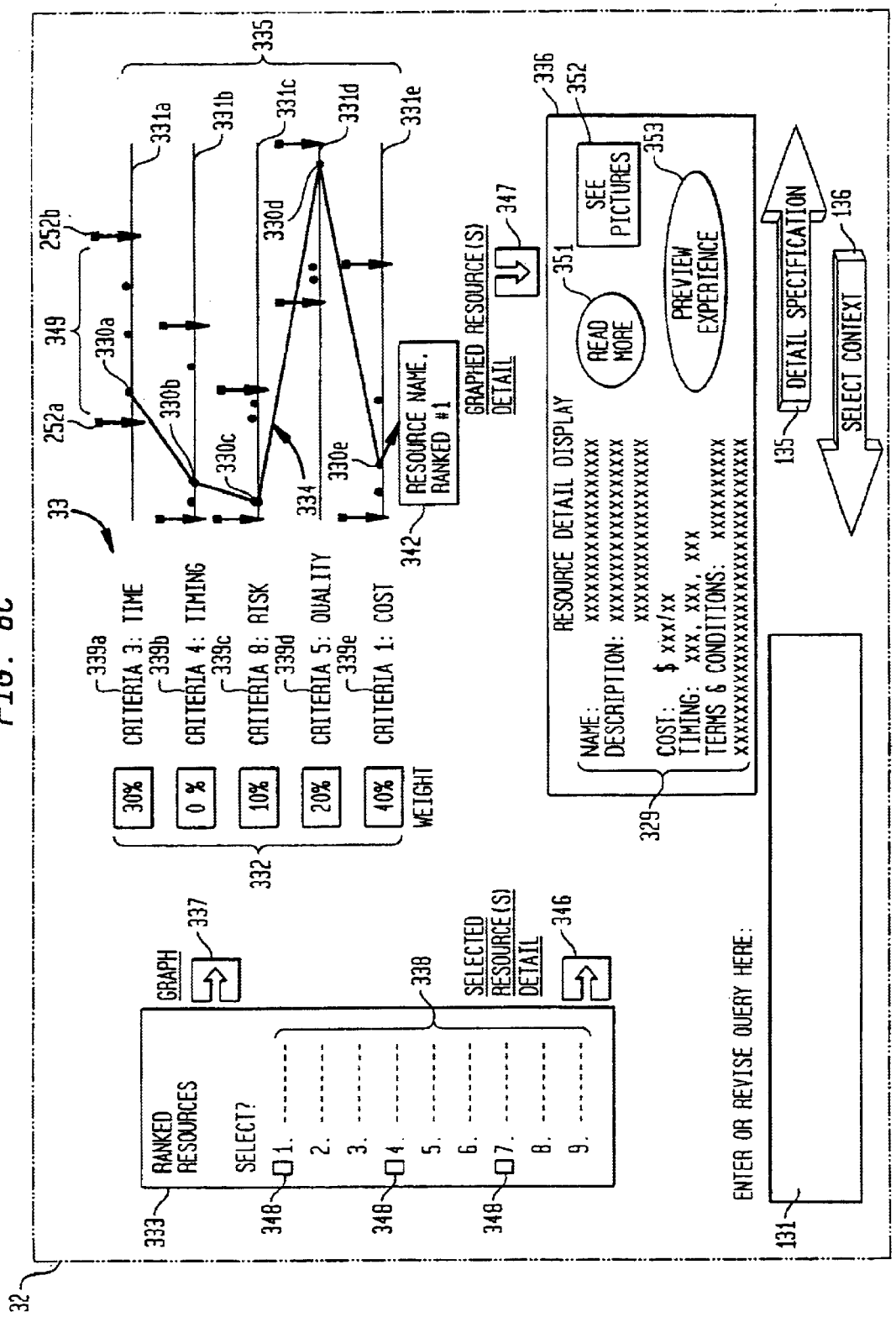

CUSTOMER SELF SERVICE ICONIC INTERFACE FOR RESOURCE SEARCH RESULTS DISPLAY AND SELECTION

BACKGROUND OF THE INVENTION

1. Field of the Invention

This invention relates generally to the field of customer self service systems for resource search and selection, and more specifically, to a novel graphical user interface for such a system.

2. Discussion of the Prior Art

Currently there exist many systems designed to perform search and retrieval functions. These systems may be classified variously as knowledge management systems, information portals, search engines, data miners, etc. However, providing effective customer self service systems for resource search and selection presents several significant challenges. The first challenge for current systems with query capability is that serving queries intelligently requires a large amount of user supplied contextual information, while at the same time the user has limited time, patience, ability and interest to provide it. The second challenge is that searching without sufficient context results in a very inefficient search (both user time and system resource intensive) with frequently disappointing results (overwhelming amount of information, high percentage of irrelevant information). The third challenge is that much of a user's actual use and satisfaction with search results differ from that defined at the start of the search: either because the users behave contrary to their own specifications, or because there are other contextual issues at play that have not been defined into the search.

Graphical user interfaces (GUIs) provide ways for users of computers and other devices to effectively communicate with the computer. In GUIs, available applications and data sets are often represented by icons consisting of small graphical representations which can be selected by a user and moved on the screen. The selection of icons often takes the place of typing in a command using a keyboard in order to initiate a program. In general, icons are tiny on-screen symbols that simplify functions like the access to a program, command, or data file. Icons are usually activated or selected by moving a mouse-controlled cursor onto the icon and pressing the mouse button.

GUIs for customer self service systems for resource search and selection have the potential to enable users to efficiently enter large amounts of contextual information. The prior art has addressed a 1:1 correspondence between a limited range of contextual variables and icons. A major limitation of these approaches is that they fail to address the full range of relevant user contextual variables as part of the query and require extensive time and patience on the part of the user to make even limited contextual selections. Another limitation of these approaches is that they lack the means to express the relevance of the results to a particular user's context, in terms beyond that of the results' content. Another limitation of these approaches is that they fail to provide for a graphical method of fine tuning the variables relevant to the search. These approaches do not provide an iconic interface for visualizing, manipulating, tuning and filtering the multidimensional context and content variables associated with selected resources returned by a search after a query. Users are forced to select from returned resources on the basis of content alone before they realize that the resources are not appropriate to the user's context.

As will be hereinafter explained in greater detail, some representative prior art search and retrieval systems implementing include U.S. Pat. No. 5,303,361 entitled "Search and Retrieval System"; U.S. Pat. No. 5,524,187 entitled "Worlds-Within-Worlds Nested Display and Interaction System and Method"; U.S. Pat. No. 5,546,516 entitled "System and Method for Visually Querying a Data Set Exhibited in a Parallel Coordinate System"; U.S. Pat. No. 5,608,899 entitled "Method and Apparatus for Searching a Database by Interactively Modifying a Database Query"; U.S. Pat. No. 5,768,578 entitled "User Interface for Information Retrieval System"; U.S. Pat. No. 5,841,437 entitled "Method and Apparatus for Interactive Database Queries via Movable Viewing Operation Regions"; U.S. Pat. No. 5,850,531 entitled "Method and Apparatus for a Slider"; U.S. Pat. No. 5,918,217 entitled "User Interface for a Financial Advisory System"; U.S. Pat. No. 5,930,501 entitled "Pictorial User Interface for Establishing Time of Day and Geographical or Environmental Context on a Computer Display or Other Monitor"; U.S. Pat. No. 5,794,178 entitled "Visualization of Information Using Graphical Representations of Context Vector Based Relationships and Attributes"; U.S. Pat. No. 6,014,661 entitled "System and Method for Automatic Analysis of Data Bases and for User-Controlled Dynamic Querying"; and U.S. Pat. No. 6,097,386 entitled "Data Processing System Having Context Sensitive Visual Feedback for User Interface Controls and Method Therefor".

U.S. Pat. No. 5,303,361 describes a text search and retrieval system which builds an index representing every word in stored files created by a variety of applications, searches for requested words using the index, ranks the files based on the relative strength of match with the search request and displays the ranked filenames for user selection.

U.S. Pat. No. 5,524,187 describes nested coordinate systems that are used for the display and manipulation of multivariate data in any field including science, engineering, economics, demographics, business, and finance. A first, inner coordinate system contains a display corresponding to a subset of the variables while the other variables are held constant. Each axis of a second, outer coordinate system is associated with an additional variable. The coordinates of a distinguished point in the first coordinate system (e.g., its origin) fix a value for each of the outer coordinate system's variables that is held constant within the inner coordinate system and its descendants for the evaluation of data displayed within them. Analogously, the second coordinate system may be recursively nested in one or more additional coordinate systems to allow the system to handle an arbitrary number of variables. Each coordinate system may be of arbitrary dimension, 1-, 2-, and 3-D coordinate systems being most familiar to a user. Although this patent deals with the display of, and interaction with, multidimensional data, the system described recursively nests additional dimensions and does not represent all dimensions simultaneously on the screen.

U.S. Pat. No. 5,546,516 is directed to a system for displaying a multi-variate data set in a plurality of multi-dimensional presentations on a computer having a graphical interface and a keyboard input.

U.S. Pat. No. 5,608,899 describes an apparatus for searching a database and modifying database queries including an approach to searching multidimensional data, e.g., by constructing a query from a sequential process of identifying constraints from bar, line, and pie charts.

U.S. Pat. No. 5,768,578 describes an information retrieval system user interface for retrieving information from a plurality of sources and for storing information source descriptions in a knowledge base. The user interface includes a hypertext browser enabling a user to browse an unstructured information space and, a knowledge base browser/editor for displaying a directed graph representing a generalization taxonomy of the knowledge base, with the nodes representing concepts and edges representing relationships between concepts. The system also allows for querying a structured information source and using query results to focus the hypertext browser on the most relevant unstructured data sources.

U.S. Pat. No. 5,841,437 describes an information visualization system that uses dynamic queries in combination with movable viewing operation regions for searching of two dimensional databases.

U.S. Pat. No. 5,850,531 describes a system that has a graphical user interface GUI) that allows a user to readily define and manipulate using graphic slider controls a transform function from one attribute, such as numerical value, to another attribute that is more understandable by the user such as color, size or location. While implementing slider thumbs to manipulate attributes, the manipulated data is plotted elsewhere on the screen and the sliders are not tied directly to the representation of the data itself.

U.S. Pat. No. 5,918,217 describes a user interface for a financial advisory system in which a user may interactively explore how changes in one or more input decisions such as a risk tolerance, a savings level, and a retirement age affect one or more output values such as a probability of achieving a financial goal or an indication of short-term risk. Although it deals exclusively with financial systems, the concept of enabling interactive exploration of a multidimensional data set is described.

U.S. Pat. No. 5,930,501 describes a system for retrieving and displaying a pictorial user interface on a computer display or other monitor and addresses the issue of a single context variable with a pictorial approach.

It would be highly desirable to provide a graphical user interface for a customer self service resource search and selection system that is capable of addressing multiple context variables abstractly, using an interactive information graphic.

Particularly, U.S. Pat. No. 5,794,178 describes a system and method for automatically generating context vectors representing conceptual relationships among information items by quantitative means for use in storage and retrieval of documents and other information items and for displaying them visually to a user. A neural network operates on a training corpus of records to develop relationship-based context vectors based on word proximity and co-importance using a technique of "windowed co-occurrence". Relationships among context vectors are deterministic, so that a context vector set has one logical solution, although it may have a plurality of physical solutions. No human knowledge, knowledge base, or conceptual hierarchy, is required. Summary vectors of records may be clustered to reduce searching time, by forming a tree of clustered nodes. Once the context vectors are determined, records may be retrieved using a query interface that allows a user to specify content terms, Boolean terms, and/or document feedback. Thus, context vectors are translated into visual and graphical representations to thereby provide user visualization of textual information and enable visual representations of meaning so that users may apply human pattern recognition skills to document searches.

U.S. Pat. No. 6,014,661 describes a system that utilizes user-adjusted relevance criteria to generate a query. It is primarily directed to a main processing system that accesses a database, which contains data records, each of which is divided into data fields. The system preferably automatically determines the type of data in each field, as well as its range of values. It then determines one or more relational structures of the field data using a corresponding number of relevance measures. For each field, a preferably user-adjustable, software-generated query device is displayed, preferably in the order of the relevance measures of the respective fields. The plot of one or more fields' data relative to that of another field is initially generated using the fields in order of relevance. The relevance measure forming the basis of the field ordering, the order of fields, and the ranges of the plotted, displayed fields may be adjusted interactively by the user by moving and adjusting the various query devices.

U.S. Pat. No. 6,097,386 is directed to a data processing system that transforms the limited user interface toolkits currently in use in the software development industry to provide control interfaces which are sensitive to a user's operational context.

The prior art has addressed the issues of database searching, dynamic query formulation, and the visual representation of multidimensional data. Newer search engines are just beginning to use some of these ideas to express queries and results. There has heretofore never been an information search and retrieval method providing the means to express the relevance of the results to a particular user in terms beyond that of the results' content.

Commonly-owned, co-pending U.S. patent application Ser. No. 09/699,975, (END9-2000-0127, filed Oct. 30, 2000 entitled "Visually Browsing Product Information with a Modified Parallel Coordinate System" describes a user interface for e-commerce applications and products, however, does not include the notion of value-based filtering. Particularly, it describes a means of realizing online catalogs for e-commerce applications, and not a means for representing search results and their relevance.

It would be highly desirable to provide in a customer self service system, an interface that facilitates the efficient location of relevant resources by the user by enabling the expression of a user's context as part of the query, and the relevance of the results to that context.

More specifically, it would be highly desirable to provide in a customer self service system, an intuitive graphical user interface that provides elements to enter search terms, select and fine tune user context definitions from pull-down menus as part of the query, establish inclusionary and exclusionary resource filters, and specify resource priorities by selecting, sequencing and weighting relevant criteria.

SUMMARY OF THE INVENTION

It is an object of the present invention to provide an intuitive graphical user interface for a customer self service system for resource search and selection that facilitates the efficient location and selection of relevant resources by a user.

It is a further object of the present invention to provide an intuitive graphical user interface for a customer self service system for resource search and selection that presents the resource set in a way which clearly illustrates their degree of fit with the user's most important context variables, as indicated by their prior usage of the system, as well as by context choices for a current user query.

It is yet another object of the present invention to provide an intuitive graphical user interface for a customer self service system for research search and selection that permits visualization and exploration of the response set.

It is still another object of the present invention to provide an intuitive graphical user interface for a customer self service system for research search and selection that provides an ordered and annotated set of resources that the system has found to best match the user's initial query and related subject and context variables.

It is still a further object of the present invention to provide an intuitive graphical user interface for a customer self service system that addresses the browsability of the data from a single, very-low resolution screen and that incorporates the notion of value-based filtering by enabling establishment of inclusionary and exclusionary resource filters, and enabling the specification of resource priorities by selecting, sequencing and weighting relevant resource criteria.

According to the invention, there is provided a graphical user interface for a customer self service system that performs resource search and selection including a system and method for controlling a display of resources resulting from a query initiated by a user of the system. The system and method for controlling the display includes: enabling via a first graphic interface, entry of a query and selection of one or more user context icons, each representing a context associated with the current user situation and having context attribute parameters associated therewith; enabling user specification of relevant resource selection criteria for enabling expression of relevance of resource results in terms of user context; searching a resource database and generating a resource response set for best matching a user's query, user context attributes and user defined relevant resource selection criteria; and, displaying via a second graphic interface, the response set of resources that the customer self service system has determined to match the user's query based on the user's context, attributes and user defined resource selection criteria utilized in search. Central to the system is the expression of the relevance of results in terms of user context in a manner optimized to facilitate resource selection.

Thus, the invention provides two graphical workspaces, one for displaying the best search results, including graphical elements for a ranked list, result details and result selection criteria plots, and another for fine tuning previously specified search details, including user query, user context attribute values, include/exclude filters and selection criteria choices, weights and sequences.

Advantageously, such a customer self service system is applicable to a variety of customer self service domains including education, real estate and travel.

BRIEF DESCRIPTION OF THE DRAWINGS

Further features, aspects and advantages of the apparatus and methods of the present invention will become better understood with regard to the following description, appended claims, and the accompanying drawings where:

FIG. 3 provides examples of data elements from the education, real estate and travel domains given example user interactions with the customer self service system via the iconic interfaces of the invention.

FIGS. 6(a)–6(c) illustrates in detail the third iconic Graphical User Interface 32 including the Results Display Workspace 33 that enables the user to visualize and explore the response set according to the invention.

DETAILED DESCRIPTION OF THE PREFERRED EMBODIMENTS

Figure 1:
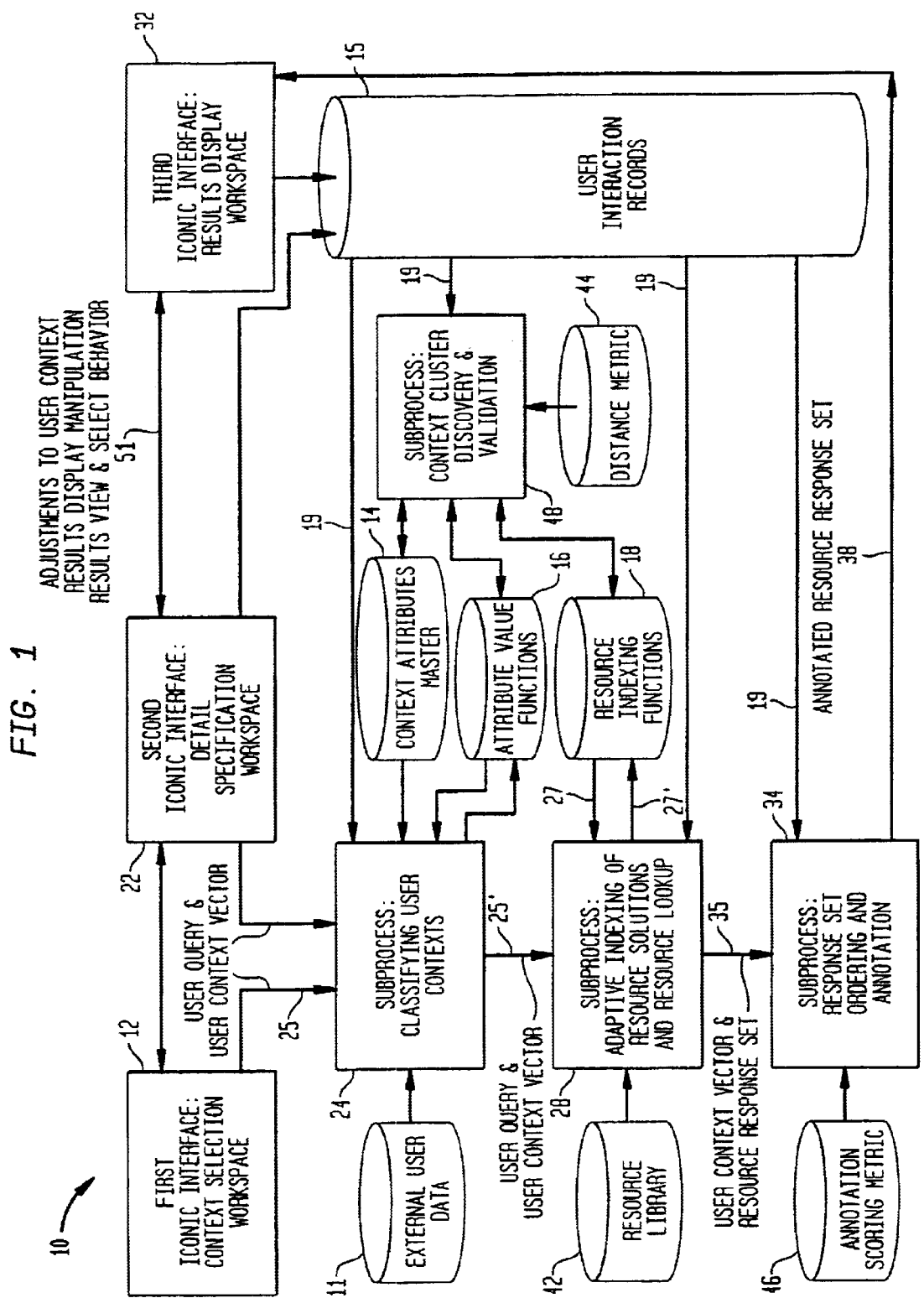
FIG. 1 is a flowchart showing the steps of the control flow between the component inventions included in the generic preferred embodiment of the system.

FIG. 1 illustrates a customer self service system ("system") 10 which is described in detail commonly-owned, co-pending U.S. patent application Ser. No. 09/778,146 entitled CUSTOMER SELF SERVICE SYSTEM FOR RESOURCE SEARCH AND SELECTION the contents and disclosure of which are incorporated by reference as if fully set forth herein. The system 10 is a comprehensive self service system providing an end-to-end solution that integrates the user and system, the content and context, and, the search and result so that the system may learn from each and all users and make that learning operationally benefit all users over time. The present invention particularly comprises an intuitive iconic graphical user interface (GUI) that facilitates the efficient location and selection of relevant resources by a user. As will be described, the iconic graphical elements and workspaces provided via the interface of the invention presents the resource set in a way which clearly illustrates their degree of fit with the user's most important context variables, as indicated by their prior usage of the system, as well as by context choices for the current query. The ordered and annotated set of resources that the system has found to best match the user's initial query and related subject and context variables is displayed through the iconic interface for visualizing and exploring the response set.

Particularly, as shown in FIG. 1, the self service system provides a three-part intuitive iconic interface comprising interface components 12, 22 and 32 for visualizing and exploring the set of resources that the system has found to match the user's initial query and related subject and context variables. The system 10 preferably enables the expression of a user's context as part of the query and expresses the relevance of the results to a particular user via the interface in terms beyond that of the results' content. The resource set is presented to the user in a way which clearly illustrates their degree of fit with the user's most important context variables, as indicated by their prior usage of the system, as well as by context choices for the current query. The system displays the resources in the sequence specified by the user and enables the user to select and weight the criteria to be used in interpreting and selecting between resources. This provides a shifting of the user's focus from finding something, to making choices among the set of resources available. Via the interface components 12, 22 and 32, the user may redefine their query, preview some or all of the suggested resources or further reduce, and redisplay the response set to extract those with the best degree of fit with that user's current needs. The system generates and displays via the interface a listing of the currently active inclusionary and exclusionary content filters and provides a means for modifying them. More specifically, the intuitive user interface of the invention enables users to specify the variables of their resource needs.

Figure 2:
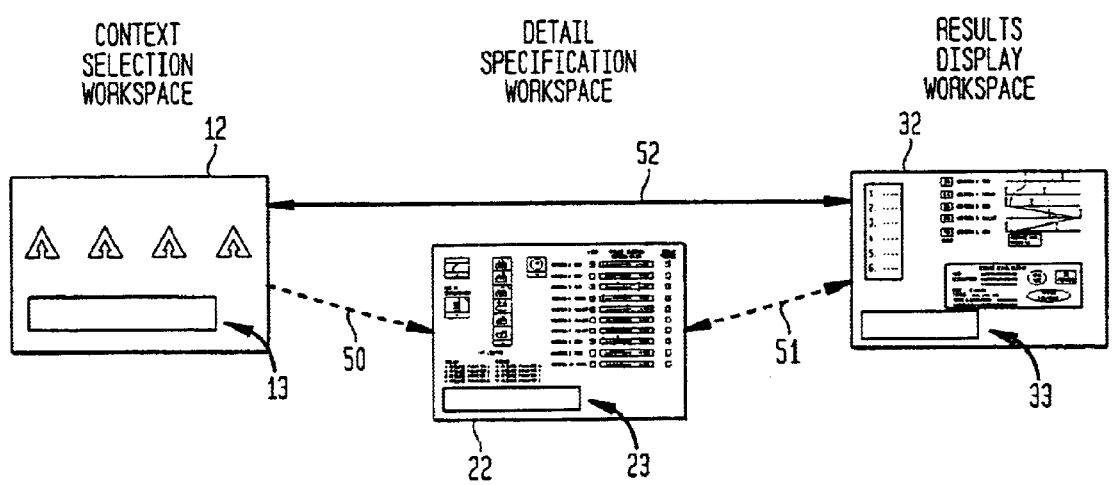
FIG. 2 is a flowchart showing the generic process steps of the user's interaction with the customer self service system through the iconic interfaces of the preferred embodiment of the invention.

FIG. 2 particularly depicts reduced-size displays illustrating the three iconic user interfaces 12, 22, 32 which comprise the respective workspaces according to the invention. As will be described in greater detail herein, the first graphical user interface 12 comprises an initial Context Selection Workspace 13 that enables the expression of user context as part of a query in a manner optimized for ease of use; the graphical user interface 22 shown in FIG. 2 provides a Detailed Specification Workspace 23 including a visual representation of multi-dimensional data for expressing query and results that enables users to completely manage their search in a manner optimized for simplicity and clarity of logic; and, the graphical user interface 32 is directed to a Results Display Workspace 33 that enables expression of relevance of results in terms of user context in a manner optimized to facilitate resource selection using user supplied decision criteria. Aspects of interfaces 12, 22 and 32 shown in FIG. 2 according to the invention are described in greater detail herein and additionally in commonly-owned, co-pending U.S. patent application Ser. No. 09/778,136 entitled CUSTOMER SELF SERVICE ICONIC INTERFACE FOR PORTAL ENTRY AND SEARCH SPECIFICATION the contents and disclosure of which are incorporated by reference as if fully set forth herein.

Referring back to FIG. 1, there is depicted a conceptual control flow 10 for the customer self service resource search and selection system according to a preferred embodiment. Via the three-part intuitive graphic user interface (GUI) users are enabled to enter queries and manipulate the system's responses according to their resource needs. Behind the scenes, as will be described, is a set of sub-system components that cooperate to derive, assume, sense and infer particular user contexts with minimal user effort. These components include databases such as: 1) a Context Attributes Master database 14 which stores the definitions of all the attributes known to the system and their relationships to predefined user contexts; 2) an Attribute Value Functions database 16 which stores the definitions and logic associated with assigning a value to an attribute for specific instances (context default, groups of users); 3) a Resource Indexing Functions database 18 which stores the definitions and logic for mapping specific resources to specific context sets; and, 4) a historical User Interaction Records database 15 which stores the users' prior queries, responses, and interactions with the system 10. The first three databases are created before system startup and the User Interaction Records 15 is created with the first user/use of the system, however, it is understood that all four databases are maintained and enhanced through system operations described below.

First, prior to a user signing on to the system, and before the user first views the iconic interface 12, the system 10 performs several pre-processing steps including: 1) creating of an empty "user context vector" 25 and populating the context vector with minimal information from external data elements 11 integrated with the system or, from system sensing/discovery; and, 2) processing the minimal user context vector 25 against the Context Attributes database 14, the Attribute Value Functions database 16, and the User Interaction Records database 15 using context classification logic to result in a "suggestion" that this particular user may be classified into one of a small number of user context definitions from the system's predefined long list of context definitions. After these pre-processing steps, the first iconic interface 12 is then displayed for the user at the user's terminal, or web-browser, in the case of resource searches conducted over a web-based communication link. The iconic Context Selection Workspace 13 initially displays a small set of User Context Icons it has determined are most appropriate, captures the user's selection of the one that seems most fitting for the current user search session, and captures the user's actual query. In most cases, this minimal entry will suffice to begin the search because the system has already determined the relevant attributes, default values and parameters to drive the system forward through the user search without any additional entry on the user's part. However, if the user wishes to review their defaults or to fine tune some context or resource variables, there is an option to proceed to the iconic Detailed Specification Workspace display 22 before starting the search. These two workspaces 12, 22 and their iconic elements are described more fully herein.

Regardless of the screen navigation path chosen, when the user initiates the query, the system 10 packages the user query with a detailed User Context Vector 25 summarizing what is known of the user's needs at this point. Once the search is initiated, the query and context vector are processed sequentially through three distinct sub-processes: 1) a Classifying User Contexts sub-process 24; 2) an Adaptive Indexing of Resource Solutions and Resource Lookup sub-process 28; and, 3) a Response Set Ordering and Annotation sub-process 34.

Particularly, the Classifying User Contexts sub-process 24, receives as input the user query and the raw context vector 25 and External User Data 11, and processes these against the User Interaction records 19 for this user/user group, data from the Context Attributes Master 14 and Attribute Value Functions 16. The system classifies this specified user interaction state and annotates the context vector 25' with a complete set of context parameters for use in subsequent processing. The Classifying User Contexts sub-process 24 particularly applies an inductive learning algorithm as an attempt to predict derived contexts. Additionally, the Classifying User Contexts sub-process 24 updates the Attribute Value Functions database 16 with more enhanced functions. The actual processing via Context Classifier and Context Applier is described in greater detail in commonly-owned, co-pending U.S. patent application Ser. No. 09/778,378 entitled CUSTOMER SELF SERVICE SUBSYSTEM FOR CLASSIFYING USER CONTEXTS, the contents and disclosure of which are incorporated by reference as if fully set forth herein.

As the customer self service system is provided with functionality enabling a user to "bookmark" their stopping point in a prior session and to resume with a "work-in-process" data set, the initial settings may be modified based upon system discovery or user override at the time of inquiry, resulting in the raw contexts associated with the user's current inquiry transaction. It is this raw context data which serves as input to the context classifier sub-process 24.

The Adaptive Indexing of Resource Solutions and Resource Lookup sub-process 28 receives as input the user query and the context vector 25' and processes them against a Resource Library 42, the User Interaction Records for this user/user group 19, and the Resource Indexing Functions 27. This sub-process particularly maps specific contexts to specific resources so as to increase the relevance of search results for a given user in their current context without requiring the user to explicitly train the system. The primary output of the Adaptive Indexing of Resource Solutions and Resource Lookup sub-process 28 is a newly identified Resource Response Set 35 which is input to the Response Set Ordering and Annotation sub-process 34. The Adaptive Indexing of Resource Solutions and Resource Lookup sub-process 28 additionally generates a secondary output which comprises updates to the Resource Indexing Functions database 18 with yet more enhanced functions 27'. Further details regarding the Adaptive Indexing of Resource Solutions and Resource Lookup sub-process 28 may be found in commonly-owned, co-pending U.S. patent application Ser. No. 09/778,135 entitled CUSTOMER SELF SERVICE SUBSYSTEM FOR ADAPTIVE INDEXING OF RESOURCE SOLUTIONS (YOR8-2000-0928, ), the contents and disclosure of which are incorporated by reference as if fully set forth herein.

The Response Set Ordering and Annotation sub-process 34 receives as input the User Context Vector and Resource Response Set 35 and processes it against data from an Annotation Scoring Metric database 46 and User Interaction Records 19 for the particular user/group. This sub-process 34 weights and ranks the potential responses according to the resource selection criteria specified by the user on the Detailed Specification Workspace described herein, and takes into consideration the scoring metric. The sub-process 34 additionally tags the response set with data elements necessary for display and manipulation on a visualization system, including, but not limited to, the Results Display Workspace 32 described herein, again according to user specifications, and particularly generates as output an Annotated Resource Response Set 38. Further details regarding the Response Set Ordering and Annotation sub-process 34 may be found in commonly-owned, co-pending U.S. patent application Ser. No. 09/778,139 entitled CUSTOMER SELF SERVICE SUBSYSTEM FOR RESPONSE SET ORDERING AND ANNOTATION, the contents and disclosure of which are incorporated by reference as if fully set forth herein.

As mentioned, the ordered and annotated set of resources that the system has found to best match the user's initial query and related subject and context variables may be utilized to drive a visualization system, including but not limited to, the intuitive iconic interface 32 for visualizing and exploring the response set as will be described in greater detail herein. Particularly, this interface provides a Results Display Workspace 33 enabling the user to continue working to learn about the resources suggested (detail/preview), narrow their results (selection) or redisplay them in a more meaningful view for decision making (graphically). In most instances, that will suffice. However, should the user wish to further refine their query, tune or override their current or default settings, that option is also available by navigating back to the Detailed Specification Workspace interface 22. If the user needs to start over, including selection of a new user context, it will be necessary to navigate back to the initial Context Selection Workspace 13.

Having completed the transaction, there is one more sub-process which is essential to this system: the sub-process for Context Cluster Discovery and Validation 48. This batch process, occurring asynchronously and constantly, applies unsupervised (machine) learning to cluster user interaction records and to assist in the identification of new user contexts, attribute value functions and resource indexing functions. The User Interaction Records 19 are processed against the Context Attributes Master database 14, the Attribute Value Functions database 16 and the Resource Indexing Functions database 18 and a Distance Metric 44 which helps determine "how close is close", i.e., "what's good enough" for a variety of factors. When validated by a systems administrator, additional user contexts may be implemented (manually or semi-automatically) in the databases and visibly as new icons on the Context Selection Workspace 13.

Attribute functions may also be identified and resource indexing functions may be discovered and updated in the appropriate files automatically. All of these additional classifications improve the ease of use, accuracy, and predictability of the system over time. Further details regarding the Context Cluster Discovery and Validation sub-process 48 may be found in commonly-owned, co-pending U.S. patent application Ser. No. 09/778,149 entitled CUSTOMER SELF SERVICE SUBSYSTEM FOR CONTEXT CLUSTER DISCOVERY AND VALIDATION, the contents and disclosure of which are incorporated by reference as if fully set forth herein.

The customer self-service system and the interaction with the system through the iconic interfaces of the invention, will be described with respect to example domains such as education, travel and real estate, and further will be described from the point of view of the following users: a learner, a traveler and a real estate transactor, e.g., renter/buyer. In describing the user's interaction with the system through the iconic interfaces, a set of data elements used in the system and their characteristics are first defined as follows:

Query
    an entry field for entering search data by using text or voice methods, for example, but not limited to these methods User Context
    a User Context represents a predefined set of context attributes which are relevant to the search behavior/needs of a group of people.

More particularly, the User Context enables the packaging of a rich set of attributes about the user with a rich set of attributes about their searching and execution environment in response to "one click" of an icon for the user presented via the interface. While there are potentially a large number of potential user contexts for any user population, each individual user would likely settle on a small number that apply to them in different circumstances. The naming of these contexts is important so that the user may recognize him/herself as potentially fitting into that group. The attributes associated with a particular user context are predefined by system administration and cannot be modified by the user. Over time, the system will identify changes to the attribute set that will make a particular user context perform better for its repeated users. Over time the system will detect different attribute sets which appear to predict user needs/behaviors and might suggest new user contexts for the system.

Context Attribute
    An attribute is used to describe a characteristic associated with the User Context.

There are potentially an unlimited number of attributes defined to the system with a master list maintained in the Context Attributes Master File. New attributes are discovered and added with system administrator validation. End users may not modify the definition of a context attribute, nor its' packaging into user contexts, nor the list of values associated with each.

Attribute Value
    A list of attribute value choices is predefined for each context attribute.

The system sets a default value to each attribute based upon data lookup, sensed, or historically derived from prior user entry or behavior. Either the system or the user may modify the value initially set based upon explicit preferences or observed behavior. This value is added to the context vector used for resource lookup, and is retained in the historical User Interaction Records database 15 so it may be used to set default values for each individual each time they use the system.
Value Resource Parameters Parameters defined in terms of inclusion and exclusion that may be used as a filter to increase the relevance of the response set.

That is, with the basic search logic established, the user's query may be satisfied. However, the response set may contain a large number of resources which are not satisfactory to this individual. Value Resource Parameters defined in terms of inclusion and exclusion may be used as a filter to increase the relevance of the response set. The inclusionary parameters may be easier to establish by users new to the system and that exclusionary parameters will become more evident as users gain experience in working with the response sets.
Resource Selection Criteria and Value Ranges Parameters and specifications for ranking a user's response set to enable more informed resource selection.

Thus, even with the degree of specificity enabled by the system, and even with the constant improvement in search relevance/efficiency as it relates to user contexts, there usually may be more than one resource to present to the user (in fact, if the search is too narrow, the user may miss the opportunity to explore/discover different approaches to meeting their actual needs). As most users know (or think they know) the criteria they will apply to selecting between options, a limited set of resource selection criteria are provided by the system (the set would differ by domain). However, via an interactive graphical display provided by the iconic interface of the invention, the user may now specify acceptable value ranges and relative weighting of each criteria for ranking their response set and/or may customize the use of these criteria.

When the actual response set data is offered, most users face the reality of many options, few options, more subjective information about specific resources; and they may make tradeoffs around the selection logic. For example, the response set may be refreshed as the user may decide to eliminate a criteria, change the weight of a criteria, or change the acceptable value ranges for a criteria. From these specifications, accessible via the iconic interface of the invention, the user may determine for example, whether time, timing, flexibility, and risk may be sacrificed in order to bring the cost down below a certain dollar ($) value, and, for example, determine how much more would the user need to pay to get exactly what he/she wants exactly when he/she wants it. FIGS. 2, 4, 5 and 6(a)–6(c) depict in greater detail the iconic interfaces for the customer self service system that enable the use of a rich set of assumed, sensed, inferred, and derived contexts with minimal user effort.

With initial logon, as shown in FIG. 2, the system first presents a set of user contexts which are available to the user via the simplified iconic interface 12 of FIG. 2. The system will suggest one context over the others, but the user may select the one most appropriate to their current situation. In each session, the user selects only one user context to use, however over time each user may discover that a couple of different user contexts serve their needs in differing circumstances. On this screen 13 particularly, the user then enters a query via one or more methods including text via a web browser display interface, for example, or via voice, for example, with help of voice recognition software. It should be understood however, that query entry is not limited to these types of methods. The user will then initiate a lookup and proceed either to a third process step (via most direct path 52) for viewing a search result response set via the Results Display Workspace interface 32, or, proceed to a second step (via path 50) to optionally refine/override search variables via the Detail Specification Workspace interface 22.

Figure 4:
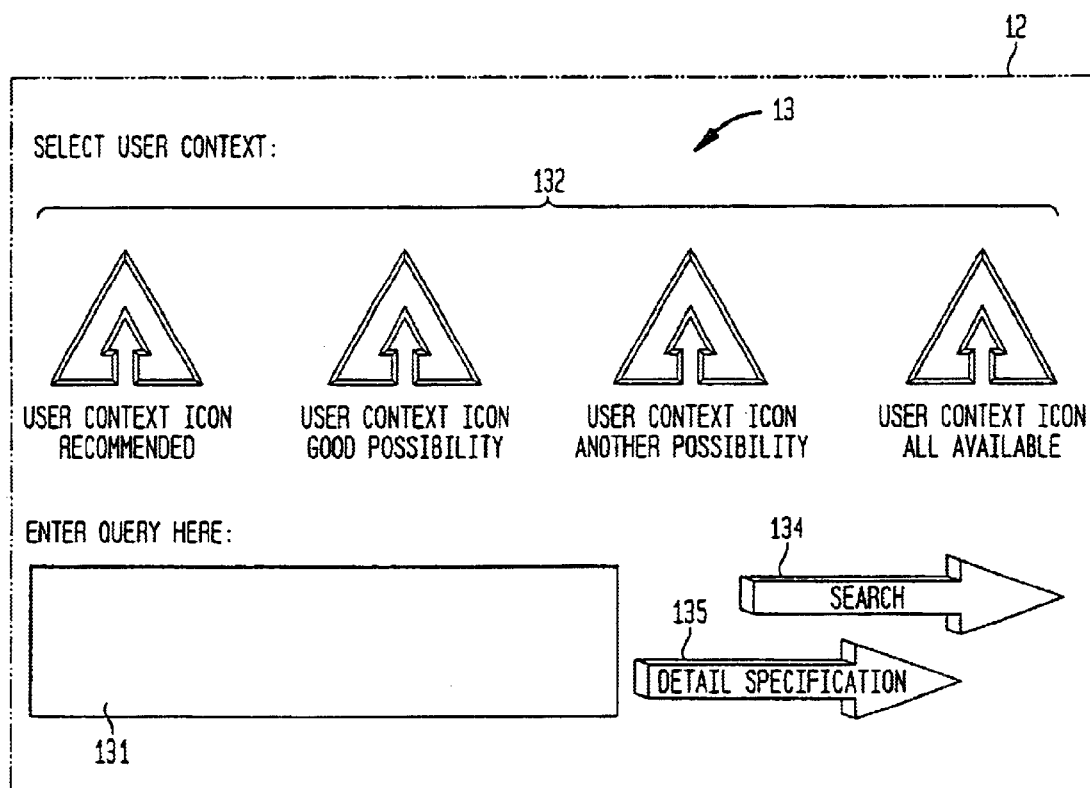
FIG. 4 illustrates the first Graphical User Interface 12 including the Context Selection Workspace 13.

FIG. 4 illustrates in detail the first graphical user interface 12 including the initial Context Selection Workspace 13 that enables the expression of user context as part of a query. As shown in FIG. 4, the Context Selection Workspace 13 includes: a series of one or more selectable User Context Icons 132 presented to the user for selecting user contexts; and, a Query Entry Field 131 enabling user entry of search terms via text or voice entry, for example. In accordance with the principles of the invention, the User Context Icons 132 are graphical user interface elements from which the user selects the one context most representative of his/her current situation. The icons presented in this interface each represent a packaging of sets of attribute-value pairs which describe a kind of user in a particular situation. Particularly, a user context represents a predefined set of context attributes which are relevant to the search behavior/needs of a group of users. For example, as described herein, context may include aspects of the user's knowledge, their relationship to organizations and/or communities, their user environment(s), and their resource need. All of these combine to provide a rich context surrounding the actual query which can significantly improve the outcome of the search through resources. The Context Selection Workspace 13 thus enables the expression of user context as part of the query and is optimized for ease of use. Particularly, the user selects from one or more of the several displayed context icons 132 by clicking on them. A context "applier" pre-process described in commonly-owned, co-pending U.S. patent application Ser. No. 09/778,378 is invoked at each session initiation for a user's search transaction, using a minimal or null user data set to produce defaults for user context, attributes, values, and resource parameters for the initial display of the Context Selection Workspace 13. This pre-processing step delivers additional benefits to the user by ensuring the use of the most current data and functions operating in the system. After making the initial query entry, by selecting hyperlink 134, the user is able to initiate the search and proceed directly to the third interface 32 which displays the actual search results. Alternately, by selecting hyperlink 135, the user may proceed to the second interface 22 having the Detail Specification Workspace 23 for further query editing and/or context refinement.

Returning to FIG. 2, with respect to the second step, the user is able to fine tune or override context attribute values, value resource parameters, and resource selection criteria and value ranges, using a drag and drop interface, iconic pulldowns, and/or slide buttons. The user may return to this screen as many times as needed to find a suitable response set. Particularly, via the second iconic interface 22, the User Context selected in the first step has been made explicit by its default settings on all the iconic interface elements listed. Thus, via a Detail Specification Workspace 23 the user may: 1) modify the query (via text entry or voice, for example); 2) change the value of attributes associated with the user context (using pull down menus); alter the value resource parameters (e.g., include/exclude) using checkboxes; 3) customize the subset of responses by altering the resource selection criteria, including the weighting of criteria and the ordering of criteria on the final display, (e.g., using checkbox and/or numeric entry); and, 4) further refine the selection by specifying minimum/maximum acceptable value ranges for resource selection criteria through drag and drop of "tabs" on sliders, for example. After making the necessary adjustment, the user re-initiates the lookup and may proceed to the third step via path 51.

Figure 5:
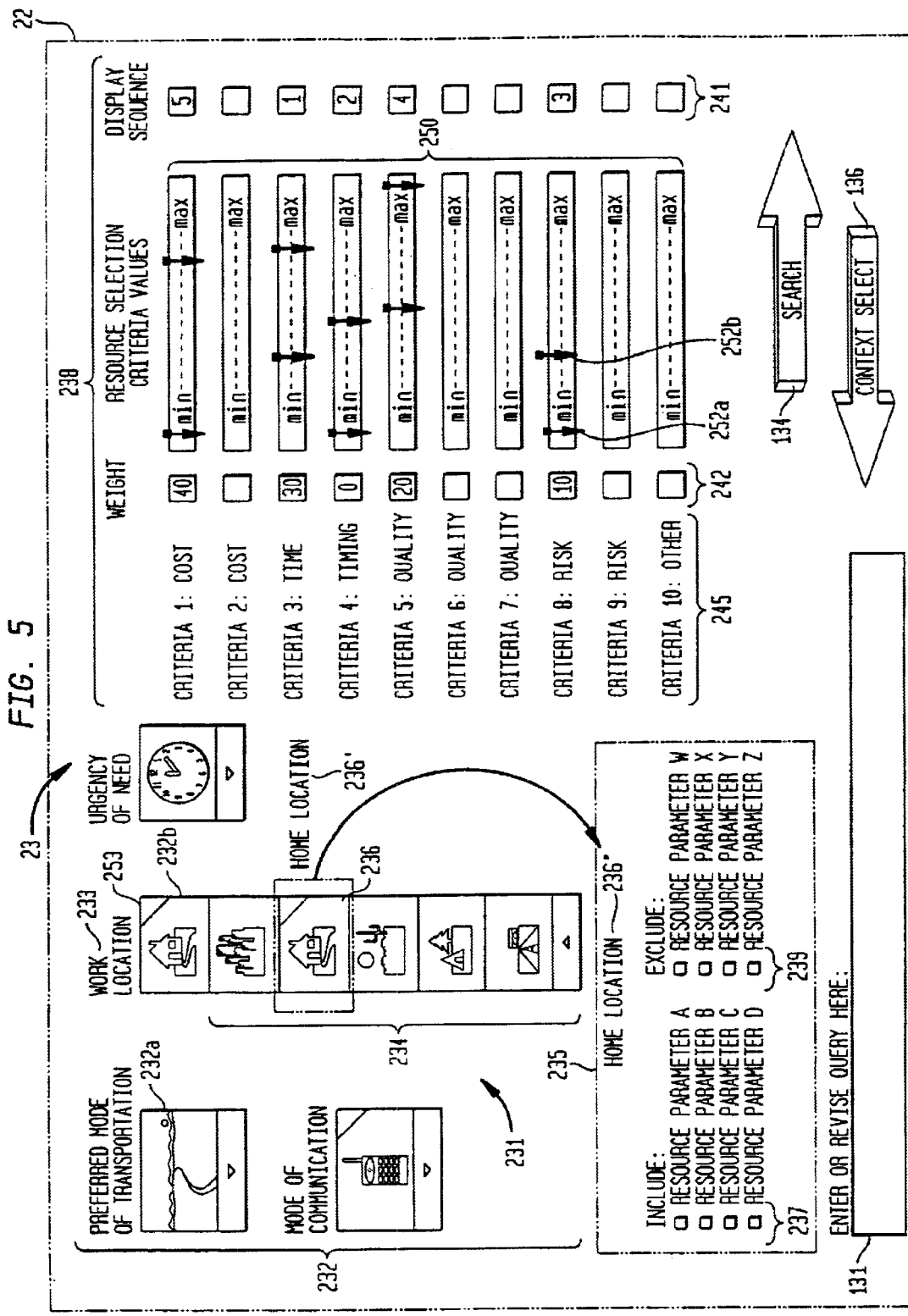
FIG. 5 illustrates the second Graphical User Interface 22 including the Detail Specification Workspace 23.

FIG. 5 illustrates in detail aspects of the second iconic graphical user interface 22 which enables the user to define or change all the parameters associated with their query 131 and (single) selected user context 132. As shown in FIG. 5, the graphical user interface 22 is divided into the following sections: a section for displaying the Query Entry field 131 as entered on the prior interface screen (FIG. 4) and available for editing; a section for displaying navigation arrows which allow the user to proceed with the search 134, or return to the initial Context Selection screen 136 via the first iconic interface to initiate a new query or select a different user context; and, a Detailed Specification Workspace 23 which is where all the search parameters can be explicitly viewed and modified. There are only two things the user cannot change from this screen: the user context selected (which they may change only on the Context Selection screen) and the context attributes which are linked to the user context (and which are predefined in the Context Attributes Master database 14).

As shown in FIGS. 5, within the Detailed Specification Workspace 23 there comprises: an Attribute-Value Workspace 231, for enabling the user to change the attribute values for all the context attributes, represented as graphic elements 232, associated with the selected user context icon 132 (FIG. 4); and, a Resource Selection Criteria Workspace 238, for enabling the user to define the criteria 245 to be used in evaluating resources, define minimum and maximum acceptable values provided on slider elements 250 corresponding to each criteria, specify the weight assigned to those criteria via selection boxes 242, and specify the positioning of those criteria in a graphical display of the resources selected via selection boxes 241. As will be described, FIG. 3 provides sample data for the context attribute, attribute value, value resource parameters, and partial resource selection criteria from different domains which may be represented in the Detailed Specification Workspace 23.

With more particularity, the Detailed Specification Workspace 23 additionally includes the Value-Resource Parameter Workspace 235, for enabling the user to change or create resource parameters using include logic 237 or exclude logic 239 for any attribute value 232 selected in the Attribute-Value Workspace 231. More specifically, the Attribute-Value Workspace 231 includes graphical representations of all the context attributes 232 associated with the single (currently active) selected user context 132. Each context attribute 232 is displayed with a text title 233 for the attribute. The currently active attribute value for that context attribute is shown on each context attribute icon. In addition, if the user has substituted, as described below, a context attribute value different than the default value provided for this user session, a marker 253 is displayed on the corner of the context attribute icon. If the user "mouse clicks" on the context attribute element, e.g., icon 232b, the system displays a pull down menu 234 of graphical elements showing all the possible attribute values for this context attribute. If the user "mouses over" any of the values from pull down menu 234, e.g., attribute value 236, a textual description 236' supporting the element may appear. By selecting a context attribute element from the pull down menu 234, e.g., element 236 shown highlighted in FIG. 5, the user is enabled to fine tune their selected context based upon their current situation. If the user "mouse clicks" on a value other than the current default, the new value is "selected" to substitute for the default. If the user "double clicks" on the attribute value, the system prepares the Value-Resource Parameter Workspace 235 for this single attribute value, as will be described. FIG. 3 provides sample data for context attributes and attribute values from different domains which may be represented in the Attribute Value Workspace 231.

In the Value-Resource Parameter Workspace 235, the user may change or create resource parameters using include logic or exclude logic for any context attribute value 232 selected in the workspace 231. Regarding FIG. 5, with more particularity, the Value-Resource Parameter Workspace 235 is displayed for one attribute value at a time and is only displayed when requested via a double click, for example, on one of the attribute values displayed in the attribute Value Workspace 231, e.g., attribute value 236. The Value-Resource Parameter Workspace 235 is a pre-formatted two-column space (dialog box) where the user may establish inclusionary resource filters via checkboxes 237 and/or exclusionary resource filters via checkboxes 239, based upon pre-established resource characteristics 236" for that selected attribute value. The value resource parameter data elements are pre-set by the user's know context, prior history of selecting from resources identified by the system, and potentially by corporate/organizational policy implemented through the system. By making these additional specifications, the user is enabled to increase the relevance of the resource response set based upon their current situation and personal preferences. When finished with these specifications, the user may double click to close this box 235 and return to the Attribute Value Workspace 231. This step can be repeated for as many attribute values as the user would like to refine and may be executed either before or after the search is conducted. Value resource parameter data elements associated with context attribute values for different domains, are provided in FIG. 3 as samples of data which may be represented in this Value-Resource Parameter Workspace 235.

Regarding FIG. 5, with more particularity, the Resource Selection Criteria Workspace 238 includes a list of criteria 245 which may be used in evaluating resources. This list, provided by the system, is customized by domain; but in all domains, it involves criteria including, but not limited to issues such as: cost, time, timing, quality and risk associated with using a particular resource to satisfy the user's specific need. The initial system default might be to use all criteria and weight them equally. Over time, however, the default criteria may be set by the system based upon user context, user prior transaction history and user behavior on prior searches. If the user wishes to further reduce the set of criteria, they may do so by assigning a weight, for example a 25 percentage weight, to each criteria they want used in the entry boxes 242. Along with each of the criteria selected there exists a range of acceptable values specified on an associated individual slider element 250. The initial system default, may be "unlimited" and then, may be set over time based upon user context, use and behavior. Additionally, the user may use drag and drop tabs 252a, b on the slider element 250 to set a minimum and/or maximum value for the associated resource selection criteria. It is understood that the unit of measure on the sliders may vary by criteria. Further, via entry boxes 241, the user may select to view via "check" or specify via number entry the display sequence of these criteria when arrayed as the axes on an n-dimensional graphic display provided in the Results Display Workspace via graphic interface 32 as described in greater detail herein.

The Detailed Specification Workspace 23 thus provides full disclosure of system defaults and enables the user to completely manage their search.

Figure 6A:
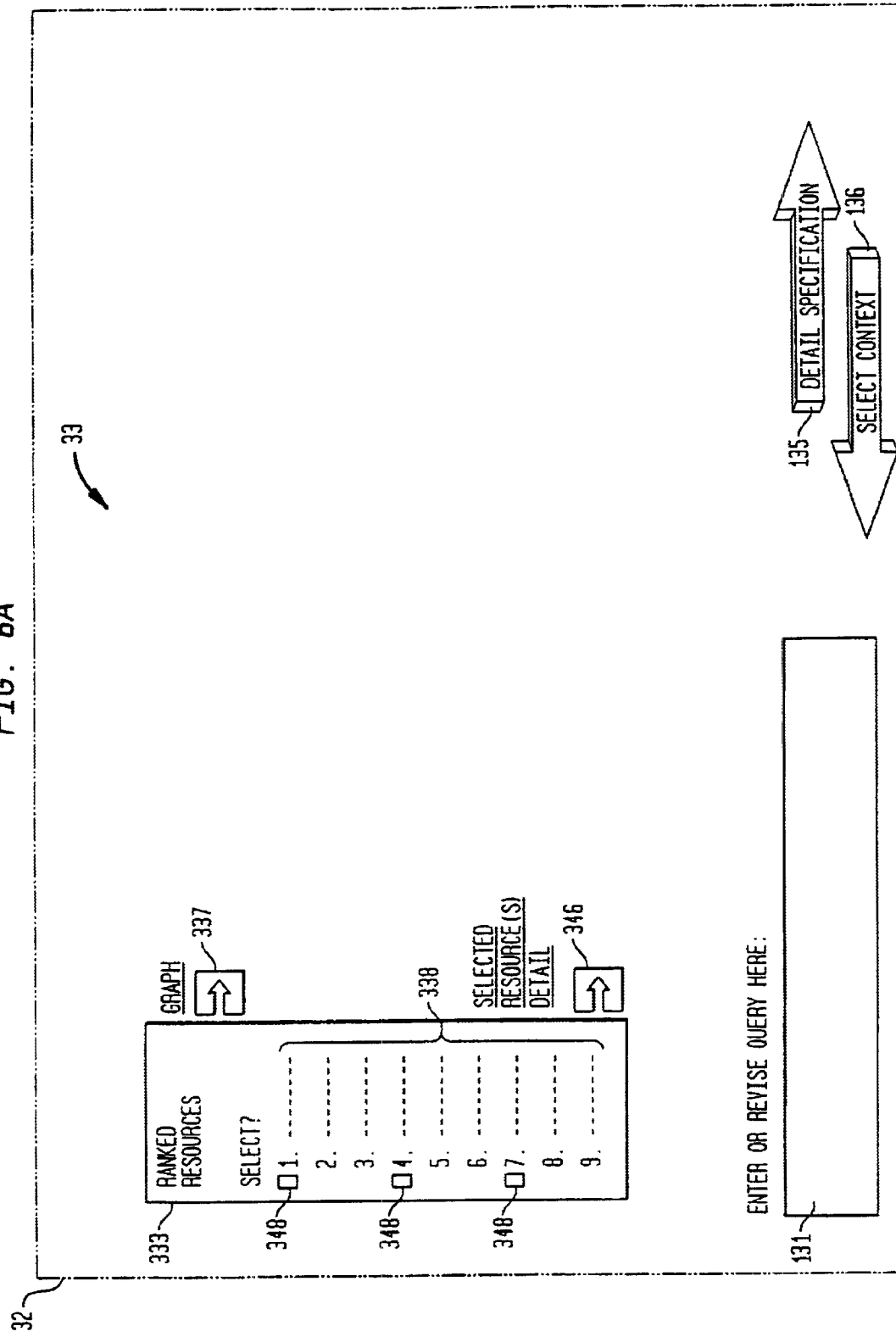
Figure 6B:
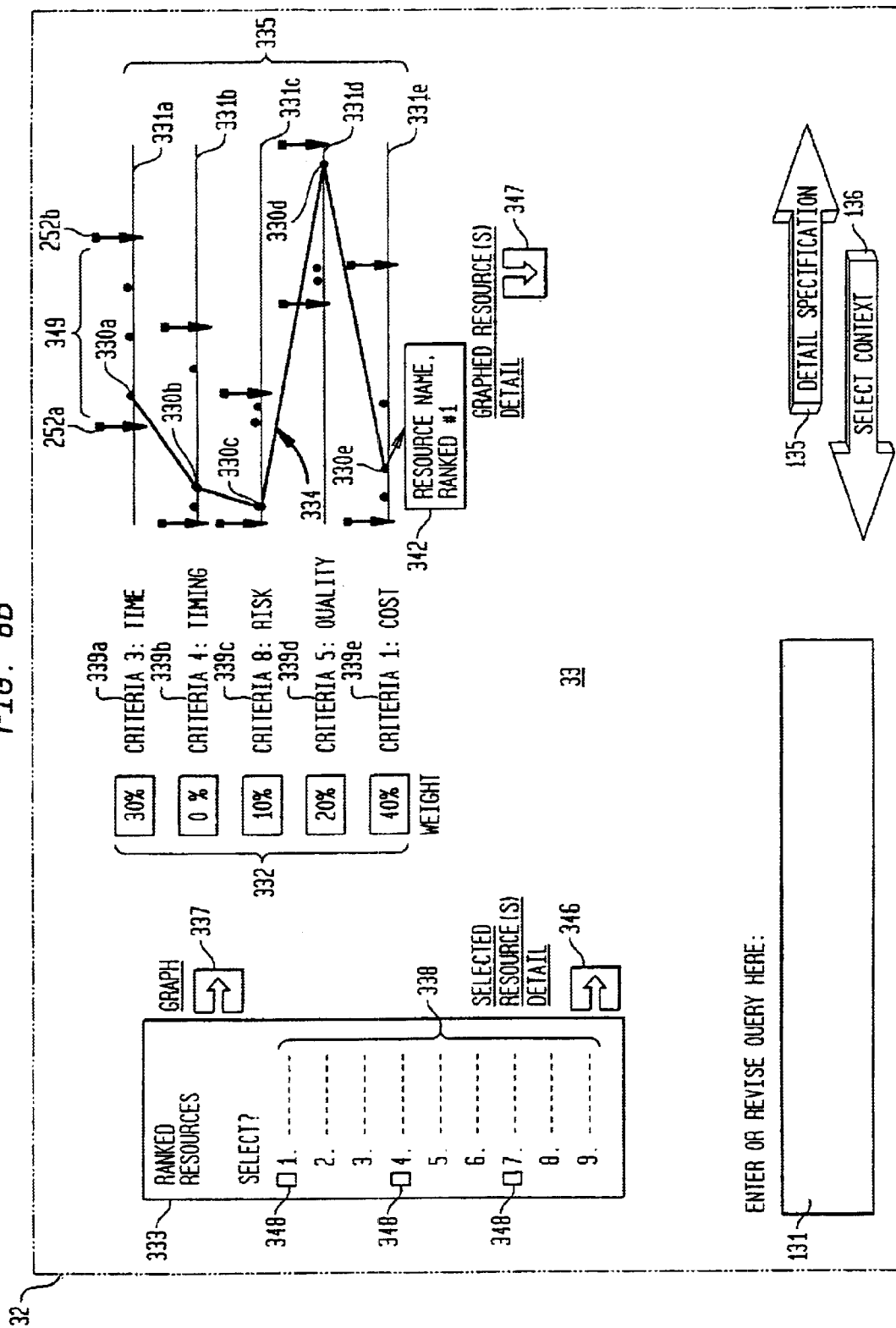

With respect to the third step, a display of the annotated response set is provided in a form ready for preview or selection as described herein with respect to FIGS. 6(a)–6(c). The user may rework this screen as many times as needed to better understand and make decisions about resource(s) to use. More particularly, via the Results Display Workspace 33 the user may: 1) view the response set, ranked by the aggregate value and weighting as defined by resource selection criteria and value ranges; 2) select one or many of the ranked responses for graphical display in multi-dimensions along the multiple axes of the resource selection criteria; and, 3) initiate a "roll over" of one or more resources from either the ranked list or the graphical display to view detailed descriptions or to "preview" the resource. If there are too many responses, too few, or if they are incorrect, the user may return to the second step to further refine/redefine, and re-execute the lookup. Alternately, the user may return to the first step to choose a different context for their search.

FIGS. 6(a)–6(c) illustrate in detail aspects of the third iconic graphical user interface 32 including the Results Display Workspace 33 that enables the user to visualize and explore the response set that the system has found to best match the user's initial query and related subject and context variables. As first shown in FIG. 6(a), the Results Display Workspace 33 of interface 32 provides a list 333 of query results, i.e., ranked resources 338, for selection by the user in response to the user's query. Via this graphic element, the user is provided with ability to select via checkboxes 348, for example, one or more resources for viewing of additional details regarding each of the selected resources. The response set 338 is ranked by the aggregate value and weighting defined by resource selection criteria and value ranges as described in commonly-owned co-pending U.S. patent application Ser. No. 09/778,136. As additionally shown in FIG. 6(a), if the user needs to start over and select a new user context, the capability is provided to navigate back to the initial Context Entry Workspace 13 (FIG. 4) by selecting link 136. For ease of use, the Results Display Workspace 33 includes a portion displaying the query entry box 131 for receiving or updating the user's query, though retaining the same user context, that was used to perform the search. Furthermore, should the user wish to further refine their query, tune or override their current or default context attribute value settings, that option is also available by navigating back to the Detailed Specification Workspace interface 22 (FIG. 5) in response to user selection of link 135 via the interface 32.

The user interface 32 of FIG. 6(a) is additionally provisioned with an icon 337 selectable for initiating the display of a graphic element representing a user's query result scores for selected resources from the list of ranked resources 333 according to their resource selection criteria. As described herein, the choices of weighting and selection of resource selection criteria are made via the Detail Specification Workspace described generally herein with respect to FIG. 5. This response set graphic is element 335 shown in FIG. 6(b) and includes an indication of the weighting 332 and selection from among the available resource selection criteria 339a, . . . , 339e and provides a graphical plot enabling the user to learn more about the resources and provide the user with a more meaningful view for response selection decision making.

Specifically, the response set graphic 335 of the Results Display Workspace 33 shown in FIG. 6(b) includes a graphical plot comprising one or more axes, with each axis 331a, . . . , 331e corresponding to each previously specified results selection criterion such as cost 339e, time 339a, timing 339b, quality 339d and risk 339c. The plot is initiated by the user's selection of one or more resources 338 from the displayed list 333 of ranked resources, and each axis is displayed in the sequence specified by the user in the detail specification workspace 23 of FIG. 5. Each axis, e.g., axis 331a, includes one or more data points 349 corresponding to each resource 348 selected from the list 333 with each data point representing the value of the particular resource selection criteria represented by the axis for that resource. As the user moves his/her mouse over a data point resource on one of the axes 331a, . . . , 331e, for example, data point 330a on axis 331a in FIG. 6(b), the resource represented by that data point is visually connected, e.g., by line 334, to all the other points for that same resource, e.g., points 330b–330e. Additionally, in response to such showing, the values for all the resource selection criteria and name and rank of the resource 342 is displayed. It is understood that the locations of the data points 349 on each axis reside between the minimum and maximum resource selection criteria values indicated by the slider bars 252a, 252b as previously set by the user in the detailed specification workspace 23 of FIG. 5.

Returning to FIG. 6(a), the interface 32 is additionally provisioned with an icon 346 selectable for initiating the display of a Resource Detail Display portion 336 shown in FIG. 6(c), which is a graphical element used to provide further details or previews of the resources 338 selected from the list of ranked resources 333. Besides providing a text description 329 of the resource, including name, cost, timing, and terms and conditions, the graphical element 336 may be provided with hyperlinks 351–353 enabling the user to read more details regarding the resource, see pictures of the resource, or preview the resource, respectively. It should be understood that icon 337 for viewing the graph or the icon 346 for viewing detailed descriptions of the actual resources are independently selectable.

As further shown in FIG. 6(b) and 6(c), the user has the additional option 347 to view a detailed description of a currently plotted resource highlighted or shown in the graphic portion 335. The detailed description of a currently plotted resource is displayed via the Resource Detail Display portion 336.

It is understood, that as the user works with the system, particularly through the Results Display Workspace 33 (FIGS. 6(a)–6(c) and the Detail Specification Workspace 23 (FIG. 5), his/her interactions are captured and stored in the User Interaction Records database 15. Thus, in addition to the user query, context vector and response data set, the system retains adjustments to user context, results display manipulation, and results viewing and selection behavior.

While the system is intended to operate on a fully enabled graphic workstation or personal computer, it is intended that search definition and the results visualization processes described herein with respect to FIGS. 4, 5 and 6(a)–6(c) may be operated by users of reduced graphics-enabled devices such as text screen workstations, Organizers, or any type of Personal Digital Assistants (PDAs). Accordingly, in alternative embodiments, all the context icons may have names, all the graphical displays may be reduced to lists, all the pull downs may be viewed as indented lists or secondary screens, and all the min-max sliders may convert to fill-in boxes. Further, as mentioned, the customer self service system described herein is applicable to many applications including the domains of education, real estate, and travel. The generic process flow described with respect to FIG. 2, will now be described with specific examples from the education, real estate and travel domains as shown in FIG. 3.

With respect to the education domain, the user is a learner and FIG. 3 depicts an example interaction with the system through the iconic interfaces (FIG. 2) included in the embodiment of the invention as applied to the education domain. The three iconic workspaces of FIG. 2 enable the learner to specify example data elements, such as the example data elements depicted in the Education (e.g., Environmental) column 60 of FIG. 3, and view results, as follows: In the first process step, the learner uses the Context Selection Workspace (interface 12 of FIG. 4) to specify their query 61 as "Learn Lotus Notes at home." The learner may select the User Context "Remote Staffie", for example (where the icon's name is highlighted in FIG. 3), from among the available set of context icons 62. The learner may then elect to go to the Detail Specification Workspace (interface 22 of FIG. 5) in the second process step in order to view the context attributes 63 associated with the "Remote Staffie" User Context. Preferably, the default assigned context attribute value ("DSL", for example) for any context attribute ("Connectivity", for example) is visible on the context attribute icon ("Connectivity", for example, whose name is shown highlighted in FIG. 3). The learner may click on the context attribute "Connectivity" to see the menu of associated attribute values 64. The learner, for example, may select the "Disconnected" attribute value shown highlighted in FIG. 3. By double clicking on this attribute value the list of Value Resource Parameters, i.e., include/exclude filters 65, for the attribute value "Disconnected" is displayed. The learner, for example, may indicate that they want to include download and play resources and exclude online collaborative resources when searching for relevant resources. The learner may additionally specify resource priorities 66 by selecting, sequencing and weighting and specifying minimum and maximum values for relevant criteria such as cost, time, quality and risk on the Resource Selection Criteria Definition graphical user interface element on the Detail Specification Workspace (interface 22 of FIG. 5). In the third step of the process, the results of the learner's search are listed in the user view of the Results Display Workspace (interface 32 of FIG. 2). The learner may immediately select one or more of the listed education resources, request to see additional details on them, or request to see a response set graphic indicating the relative positioning of each resource along each of the axes (n-dimensions, relating to cost, time, quality and risk) specified earlier. If no acceptable education resources were provided, the learner may return to the Context Selection Workspace to redefine their query or select a different User Context such as "Commuting Techie" via the first interface. The learner may additionally elect to return to the Detail Specification Workspace of the second interface to change the default value of the context attribute "Connectivity" from Disconnected to Dial-up and add or remove Value Resource Parameters for the attribute value Dial-up or other context attribute values associated with context attributes such as "Learning Mode" or "Technical Field". The learner may also change their selection criteria, the weighting of the selection criteria, and the minimum/maximum values for any selection criteria, in hopes of identifying additional relevant resources.

With respect to the education domain, the user is a "learner" however, the three iconic workspaces of FIG. 2 provide the process for enabling the learner to specify example data elements, such as the example data elements depicted in the Education (e.g., Subject Matter) column 70 of FIG. 3, and view results, as follows: In the first process step, the learner uses the Context Selection Workspace (interface 12 of FIG. 4) to specify their query 71 as "Become a Linux developer by June" for example. The learner selects the User Context "Commuting Techie" from among the available context icons 72. The learner may elect to go to the Detail Specification Workspace in order to view the context attributes 73 associated with the "Commuting Techie" user context. Preferably, the default assigned context attribute value ("Programming", for example) for any context attribute ("Technical Field", for example) is visible on the context attribute icon ("Technical Field", for example, whose name is shown highlighted in FIG. 3). In addition, the learner may click on the context attribute ("Technical Field, to stay with the example) to display a pull down menu to view the other values 74 (in either picture or word format) that could be assigned to this attribute. The learner, for example, may select "Graphical Interfaces" shown highlighted in FIG. 3. By double clicking on this attribute value, the list of Value Resource Parameters (include/exclude filters 75) for the attribute value "Graphical Interfaces" will be displayed. For example, the learner may indicate that they want to include the KDE interface and exclude the GNOME interface when searching for relevant resources. The learner may additionally specify resource priorities 76 by selecting, sequencing and weighting and specifying minimum and maximum values for relevant criteria such as cost, time, quality and risk on the Resource Selection Criteria Definition graphical user interface element on the Detail Specification Workspace. The results of the learner's search are listed on the Results Display Workspace via the interface 32. The learner may immediately select one or more of the listed education resources, request to see additional details on them, or request to see a response set graphic indicating the relative positioning of each resource along each of the axes (n-dimensions, relating to cost, time, quality and risk) specified earlier. If no acceptable education resources were provided, the learner may return to the Context Selection Workspace 13 via the first interface 12 to redefine their query or select a different user context such as "Traveling Consultant." The learner may also elect to return to the Detail Specification Workspace via the second interface 22 to change the default value of the context attribute "Technical Field" from Graphical Interfaces to Programming and add or remove Value Resource Parameters for the attribute value Programming or other context attribute values associated with context attributes such as "Learning Mode" or "Connectivity." The learner may also change their selection criteria, the weighting of the selection criteria, and the minimum/maximum values for any selection criteria, in hopes of identifying additional relevant resources.

With respect to the real-estate domain, the user is a real estate transactor (renter/buyer) and FIG. 3 depicts an example interaction with the system through the iconic interfaces (FIG. 2) included in the embodiment of the invention as applied to the real estate domain. The three iconic workspaces of FIG. 2 enable a real estate renter or buyer to specify example data elements, such as the example data elements depicted in the Real Estate column 80 of FIG. 3, and view results, as follows: In the first process step, the renter or buyer uses the Context Selection Workspace to specify their query 81 as "Find housing near new job by August." The renter or buyer selects the user context "Relocating Business Professional" from among the available context icons 82. The renter or buyer may elect to go to the Detail Specification Workspace in the second interface in order to view the context attributes 83 associated with the "Relocating Business Professional" user context. Preferably, the default assigned context attribute value ("Subcontract it all", for example) for any context attribute ("Maintenance Style", for example) is visible on the context attribute icon ("Maintenance Style", for example, whose name is shown highlighted in FIG. 3). In addition, the renter/buyer may click on the context attribute ("maintenance style, to stay with the example) to display a pull down menu to view the other values 84 (in either picture or word format) that could be assigned to this attribute. Upon renter or buyer double clicking on attribute value "Do-It-YourSelf-er", for example, the list of Value Resource Parameters (include/exclude filters 85) for the attribute value "Do-It-YourSelf-er" is displayed. For example, as shown in FIG. 3, the renter or buyer may indicate that they want to include walls, paint and lawn mowing and exclude plumbing, electrical and landscaping when searching for relevant resources. The renter or buyer may additionally specify resource priorities 86 by selecting, sequencing and weighting and specifying minimum and maximum values for relevant criteria such as cost, time, quality and risk on the Resource Selection Criteria Definition graphical user interface element on the Detail Specification Workspace. The results of the renter or buyer's search are listed on the Results Display Workspace of the third interface 32 in which the renter or buyer may immediately select one or more of the listed real estate resources, request to see additional details on them, or request to see a response set graphic indicating the relative positioning of each resource along each of the axes (n-dimensions, relating to cost, time, quality and risk) specified earlier. If no acceptable housing resources were provided, the renter or buyer may return to the Context Selection Workspace to redefine their query or select a different user context such as "Empty Nester." The renter or buyer can also elect to return to the Detail Specification Workspace to change the default value of the context attribute "Maintenance Style" from Do-It-Yourself-er to Subcontract It All, for example, and add or remove Value Resource Parameters for the attribute value "Subcontract It All" or other context attribute values associated with context attributes such as "Mode of Commute to Work/School" or "Mode of Housing." The real estate transactor may also change their selection criteria, the weighting of the selection criteria, and the minimum/maximum values for any selection criteria, in hopes of identifying additional relevant resources. With respect to the travel domain, the user is a traveler and FIG. 3 depicts an example interaction with the customer self service system through the iconic interfaces (FIG. 2) included in the embodiment of the invention as applied to the travel domain. The three iconic workspaces of FIG. 2 enable a traveler to specify data elements, such as the example data elements depicted in the Travel column 90 of FIG. 3, and view results, as follows: In the first process step, the traveler uses the Context Selection Workspace to specify their query 91 such as "Plan a trip to Vermont in June", for example. The traveler may then select the User Context Icon "Single Mom with kids", for example, from among the available user context icons 132, (where the icon's name 92 is highlighted in FIG. 3). The traveler may then elect to go to the Detail Specification Workspace in order to view the context attributes 93 associated with the "Single Mom with Kids" user context. Preferably, the default assigned context attribute value ("Drive", for example) for any context attribute ("Mode of Transportation", for example) is visible on the context attribute icon ("Mode of Transportation", for example, whose name is shown highlighted in FIG. 3). In addition, the traveler may click on the context attribute ("mode of transportation", to stay with the example) to display a pull down menu to view the other values 94 (in either picture or word format) that could be assigned to this attribute ("Fly" for example). The traveler selects "fly" as an alternative to "drive", as illustrated with highlighting in FIG. 3. By "overriding" this attribute value and double clicking on it, the list of Value Resource parameters (include/exclude filters 95) for the attribute value "Fly" is displayed. The traveler may indicate that he/she wants to include all major carriers and exclude prop planes and airlines with bad safety records when searching for relevant resources. The traveler may also specify resource priorities 96 by selecting, sequencing and weighting and specifying minimum and maximum values for relevant criteria such as cost, time, quality and risk on the Resource Selection Criteria Definition graphical user interface element on the Detail Specification Workspace. The results of the traveler's search are then displayed via the Results Display Workspace of the third iconic interface 32 of FIG. 2. The traveler may immediately select one or more of the listed travel resources, request to see additional details on them, or request to see a response set graphic indicating the relative positioning of each resource along each of the axes (n-dimensions, relating to cost, time, quality and risk) specified earlier. If no acceptable travel resources were provided, the traveler may return to the Context Selection Workspace in Step 1 to redefine their query or select a different user context such as "Swinging Singles." The traveler may also elect to return to the Detail Specification Workspace in Step 2 to change the default value of the context attribute "Mode of Transportation" from Fly to Train and add or remove Value Resource Parameters for the attribute value Train or other context attribute values associated with context attributes such as "Mode of Housing" or "Food Style". The traveler may also change their selection criteria, the weighting of the selection criteria, and the minimum/maximum values for any selection criteria, in hopes of identifying additional relevant resources.

Referring back to FIG. 1, the customer self service system implements an n-dimensional context vector 25', derived from the combination of user context and previous interaction with the system, to map specific contexts to specific resources. This increases the relevance of search results for a given user in their current context without requiring the user to explicitly train the system. Inferences and conclusions are made regarding both the individual user's preferred resource characteristics and those of a common set of users. These are used as input to the sub-processes described above and in greater detail in above-mentioned commonly-owned, co-pending U.S. patent application Ser. Nos. 09/778,378, 09/778,135, and 09/778,139 (YOR8-2000-0931, ), to modify the iconic interfaces presented to each particular user for their subsequent search using the current invention as well as to modify the results that would be selected for presentation to the user via the interface described herein in response to an identical search. Over time, the system will improve in its ability to serve individual needs and evolve to an ability to suggest preferred answers to groups of users.

The overall system also uses a batch background process described in commonly-owned, co-pending U.S. patent application Ser. No. 09/778,149 to cluster user interaction records to assist in the identification of new user contexts which serves to improve the system over time.

While the prior art has made use of adaptive learning in information retrieval systems, the overall customer self service system for resource search and selection enables the use of a large, rich set of contextual attribute-value pairs, is focused on learning about the user/user groups rather than the resources/resource groups and is able to discover user group characteristics and apply them to individuals. Much of the prior art is focused on the discovery of database structure, the clustering of data within the resources, or discovering relevant taxonomy for resources but the current system discovers contexts and context attributes among users which can be used predictively. The customer self-service system of the invention uses a highly specialized and optimized combination of supervised and unsupervised logic along with both automated and semi-automated entry of learned results and is able to deliver higher value because contexts are used in a closed loop self improvement system; front end (entry) middle (search and display) and back end (results and user feedback) are integrated. Other systems apply machine learning at the front, middle, or back, but not integrated throughout. The current system identifies context classifications and functions, and applies them to individual users to reduce the burden of fully communicating their question and increasing the specificity and accuracy of a query's search parameters. The current system identifies and improves selection logic and identifies and improves response sets to common queries based upon a rich set of contextual variables. The current system additionally orders the response set, potentially further limiting it, and prepares the response set for display in a way that identifies the "best" resources for a particular user based upon the rich set of context variables. The display of the invention additionally illustrates the decision making characteristics of the alternatives presented.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for controlling a display of resources resulting from a query initiated by a user in a customer self service system that performs resource search and selection, said system comprising:

a first graphic interface including entry field enabling entry of a query and one or more selectable user context icons, each representing a context associated with the current user situation and having context attribute parameters associated therewith, said interface further enabling user specification of relevant resource selection criteria for enabling expression of relevance of resource results in terms of user context;

mechanism for searching a resource database and generating a resource response set for matching a user's query, said searching mechanism generating a response set based on said query, user context attributes and user defined relevant resource selection criteria; and, a second graphic interface for displaying the response set of resources that the customer self service system has determined to match the user's query based on said user's context, attributes and user defined resource selection criteria utilized by said search mechanism, wherein the said second interface includes a first graphic element for displaying said response set according to a defined ranking and a second graphical element for displaying a plot comprising two or more axes with each axis corresponding to a user specified results selection criterion and each axis including points representing each of said resources selected from said first graphic element along a linear dimension, and second interface enabling the expression of relevance of results in terms of user context in a manner optimized to facilitate resource selection.

2. The system as claimed in claim 1, wherein one or more ranked resources from said first graphic element are user selectable.

3. The system as claimed in claim 2, further including mechanism for enabling user selection of a single point of a desired resource from said multi-dimensional plot, said system enabling visualization of the same resource represented as a data point upon each of said axes of said multi-dimensional plot in response to said single resource selection.

4. The system as claimed in claim 3, wherein said visualization of the same resource upon each of said axes includes graphically connecting a point corresponding to the selected resource to all the other points for that resource in said plot.

5. The system as claimed in claim 2, wherein said second graphic interface includes a display indicating a weighting of each user selected criterion at each dimension.

6. The system as claimed in claim 2, wherein each axis enables visualization of a ranking of said resources according to each selection criterion at each dimension.

7. The system as claimed in claim 6, wherein said ranking visualization of selected resources includes displaying of points representing said selected resources in relation to user-specified minimum and maximum resource selection criteria values.

8. The system as claimed in claim 2, wherein each axis of said multi-dimensional plot is displayed according to a user-defined sequence.

9. The system as claimed in claim 2, wherein said second graphic interface comprises a third graphic element for displaying a detailed description of each of said selected resources of said response set.

10. The system as claimed in claim 9, wherein said detailed description of said third graphic element includes one or more of: a text description, visual representation of a resource, and, a hyperlink to more details regarding said resource.

11. The system as claimed in claim 9, whereupon selection of a single point of a desired resource from said multi-dimensional plot, said third graphic element capable of displaying a detailed description of said corresponding selected resource.

12. The system as claimed in claim 1, wherein said relevant resource selection criteria includes one or more of: cost, risk, time, timing and quality.

13. The system as claimed in claim 1, further including mechanism for enabling user selection and modification of user context attribute values, and selection and modification of relevant resource selection criteria via said first graphic interface so that the best resources results are shown.

14. The system as claimed in claim 13, further including mechanism for enabling user customization of said relevant resource selection criteria, including said weight, sequence and acceptable resource selection criteria value ranges via, said first graphic interface, to enable increased specificity and accuracy of a query's search parameters and resource evaluation criteria and thereby identify and improve selection logic and response sets fitted to said query for display via said second graphic interface.

15. The system as claimed in claim 13, further including mechanism for enabling user selection and modification of graphical resource filters for enabling user specification of inclusionary and exclusionary resource selection parameters.

16. A method for controlling a display of resources resulting from a query initiated by a user in a customer self service system that performs resource search and selection, said method comprising the steps of:
   a) enabling via a first graphic interface, entry of a query and selection of one or more user context icons, each representing a context associated with the current user situation and having context attribute parameters associated therewith,
   b) enabling user specification of relevant resource selection criteria for enabling expression of relevance of resource results in terms of user context;
   c) searching a resource database and generating a resource response set for best matching a user's query, user context attributes and user defined relevant resource selection criteria; and,
   d) displaying via a second graphic interface, the response set of resources that the customer self service system has determined to match the user's query based on said user's context, attributes and user defined resource selection criteria utilized in search, said second interface displaying said response set according to a defined ranking and including a plot comprising two or more axes with each axis corresponding to a user specified results selection criterion and each axis including points representing each of said resources selected from said first graphic element along a linear dimension, said second interface expressing the relevance of results in terms of user context in a manner optimized to facilitate resource selection.

17. The method as claimed in claim 16, wherein one or more ranked resources from said response set are user selectable.

18. The method as claimed in claim 17, further including the steps of:
   enabling user selection of a single point of a desired resource from said multi-dimensional plot; and,
   graphically connecting said single point corresponding to the selected resource to all the other points for that resource in said plot.

19. The method as claimed in claim 17, wherein said displaying step d) further includes the step of: indicating a weighting of each user selected criterion at each dimension.

20. The method as claimed in claim 17, wherein said step of displaying a multi-dimensional plot includes providing visualization of a ranking of said resources according to each selection criterion at each dimension.

21. The method as claimed in claim 20, wherein said ranking visualization of selected resources includes displaying of points representing said selected resources in relation to user-specified minimum and maximum resource selection criteria values.

22. The method as claimed in claim 17, wherein said step of displaying a multi-dimensional plot includes displaying each axis of said multi-dimensional plot according to a user-defined sequence.

23. The method as claimed in claim 17, wherein said displaying step d) further includes the step of displaying a detailed description of each of said selected resources of said response set, said detailed description includes one or more of: a text description, visual representation of a resource, and, a hyperlink to more details regarding said resource.

24. The method as claimed in claim 18, wherein in response to selection of a single point of a desired resource from said multi-dimensional plot, the step of displaying a detailed description of said corresponding selected resource.

25. The method as claimed in claim 16, wherein said relevant resource selection criteria includes one or more of: cost, risk, time, timing and quality.

26. The method as claimed in claim 16, further including the steps of:
   enabling user selection of contexts and selection and modification of user context attribute values thereof; and
   enabling selection and modification of relevant resource selection criteria including a weight, sequence and acceptable resource selection criteria value ranges to enable increased specificity and accuracy of a query's search parameters and resource evaluation criteria and thereby identify and improve selection logic and response sets fitted to said query for display.

27. A program storage device readable by machine, tangibly embodying a program of instructions executable by the machine to perform method steps for controlling a display of resources resulting from a query initiated by a user in a customer self service system that performs resource search and selection, said method comprising the steps of:
   a) enabling via a first graphic interface, entry of a query and selection of one or more user context icons, each representing a context associated with the current user situation and having context attribute parameters associated therewith,
   b) enabling user specification of relevant resource selection criteria for enabling expression of relevance of resource results in terms of user context;
   c) searching a resource database and generating a resource response set for best matching a user's query, user context attributes and user defined relevant resource selection criteria; and,
   d) displaying via a second graphic interface, the response set of resources that the customer self service system has determined to match the user's query based on said user's context, attributes and user defined resource selection criteria utilized in search, said second interface displaying said response set according to a defined ranking and including a plot comprising two or more axes with each axis corresponding to a user specified results selection criterion and each axis including points representing each of said resources selected from said first graphic element along a linear dimension, said second interface expressing the relevance of results in terms of user context in a manner optimized to facilitate resource selection.

28. The program storage device readable by machine as claimed in claim 27, wherein one or more ranked resources from said response set are user selectable.

29. The program storage device readable by machine as claimed in claim 28, further including the steps of:
   enabling user selection of a single point of a desired resource from said multi-dimensional plot; and,
   graphically connecting said single point corresponding to the selected resource to all the other points for that resource in said plot.

30. The program storage device readable by machine as claimed in claim 28, wherein said displaying step d) further includes the step of: indicating a weighting of each user selected criterion at each dimension.

31. The program storage device readable by machine as claimed in claim 28, wherein said step of displaying a multi-dimensional plot includes providing visualization of a ranking of said resources according to each selection criterion at each dimension.

32. The program storage device readable by machine as claimed in claim 31, wherein said ranking visualization of selected resources includes displaying of points representing said selected resources in relation to user-specified minimum and maximum resource selection criteria values.

33. The program storage device readable by machine as claimed in claim 28, wherein said step of displaying a multi-dimensional plot includes displaying each axis of said multi-dimensional plot according to a user-defined sequence.

34. The program storage device readable by machine as claimed in claim 28, wherein said displaying step d) further includes the step of displaying a detailed description of each of said selected resources of said response set, said detailed description includes one or more of: a text description, visual representation of a resource, and, a hyperlink to more details regarding said resource.

35. The program storage device readable by machine as claimed in claim 29, wherein in response to selection of a single point of a desired resource from said multi-dimensional plot, the step of displaying a detailed description of said corresponding selected resource.

36. The program storage device readable by machine as claimed in claim 27, wherein said relevant resource selection criteria includes one or more of: cost, risk, time, timing and quality.

37. The program storage device readable by machine as claimed in claim 27, further including the steps of:

enabling user selection of user context attributes and selection and modification of associated context attribute values thereof; and enabling selection and modification of relevant resource selection criteria including a weight, sequence and acceptable resource selection criteria value ranges to enable increased specificity and accuracy of a query's search parameters and resource evaluation criteria and thereby identify and improve selection logic and response sets fitted to said query for display.

* * * * *

UNITED STATES PATENT AND TRADEMARK OFFICE
CERTIFICATE OF CORRECTION

PATENT NO. : 6,693,651 B2
DATED : February 17, 2004
INVENTOR(S) : Debra L. Biebesheimer et al.

It is certified that error appears in the above-identified patent and that said Letters Patent is hereby corrected as shown below:

Title page,
Item [56], References Cited, U.S. PATENT DOCUMENTS, should be added:
-- 5,446,891    8/1995         Kaplan et al.
5,826,260       10/1998        Byrd, Jr. et al. --.
OTHER PUBLICATIONS, "Göker, A., "Capturing Information Need by Learning User Context". 16$^{th}$ International Joint Conferent in Artificial Intelligence: Learning About User Workshop, Jul. 31, 1999 pp. 21-27, XP-00205013" should read -- Göker, A., "Capturing Information Need by Learning User Context". 16$^{th}$ International Joint Conferent in Artificial Intelligence: Learning About User Workshop, Jul. 31, 1999 pp. 21-27, XP-002205013 --.

Column 4,
Line 32, "October 30, 2000 entitled" should read -- October 30, 2000) entitled --.

Signed and Sealed this

Sixth Day of September, 2005

JON W. DUDAS
*Director of the United States Patent and Trademark Office*